(12) United States Patent
Yaguchi

(10) Patent No.: US 12,525,772 B2
(45) Date of Patent: Jan. 13, 2026

(54) DEVICE AND METHOD FOR FORMING A NOTCH FOR STRIPPING

(71) Applicant: Yazaki Corporation, Tokyo (JP)

(72) Inventor: Naoya Yaguchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 128 days.

(21) Appl. No.: 18/731,536

(22) Filed: Jun. 3, 2024

(65) Prior Publication Data

US 2025/0015569 A1 Jan. 9, 2025

(30) Foreign Application Priority Data

Jul. 6, 2023 (JP) .................... 2023-111454

(51) Int. Cl.
*H02G 1/12* (2006.01)

(52) U.S. Cl.
CPC ................. *H02G 1/1253* (2013.01)

(58) Field of Classification Search
CPC ...... H02G 1/1253; H02G 1/1265; H02G 1/12; H02G 1/1202; H02G 1/1248
USPC ................ 81/9.4, 9.51, 9.41, 9.42
See application file for complete search history.

(56) References Cited

U.S. PATENT DOCUMENTS

| | | | | |
|---|---|---|---|---|
| 4,745,828 A | * | 5/1988 | Stepan | G02B 6/245 81/9.42 |
| 5,361,653 A | * | 11/1994 | Pradin | H02G 1/1265 81/9.51 |
| 2020/0076148 A1 | * | 3/2020 | Houser | H02G 1/1297 |
| 2020/0412114 A1 | * | 12/2020 | Sugawara | H02G 1/005 |
| 2021/0119426 A1 | * | 4/2021 | Backenstoes | B26D 5/16 |
| 2022/0239078 A1 | * | 7/2022 | Sorg | H02G 1/127 |

FOREIGN PATENT DOCUMENTS

JP 2000-350324 A 12/2000

* cited by examiner

*Primary Examiner* — Phong H Nguyen
(74) *Attorney, Agent, or Firm* — Sughrue Mion, PLLC

(57) ABSTRACT

Each of cutting mechanisms of a device for forming a notch for stripping includes: a stopper which is capable of approaching and/or being separated away from an outer circumferential surface of a coated electric wire; a biasing part biasing the stopper; a cutter blade; a stopper movement mechanism configured to, when forming a notch, move the stopper together with the cutter blade to bring the stopper into contact with the outer circumferential surface; and a cutter movement mechanism configured to, after bringing the stopper into contact with the outer circumferential surface, forward the cutter blade to a position corresponding to a specified notch depth for forming the notch.

5 Claims, 6 Drawing Sheets

DEVICE AND METHOD FOR FORMING A NOTCH FOR STRIPPING

BACKGROUND OF THE INVENTION

Technical Field

The present invention relates to a device and a method for forming a notch for stripping in which the notch is formed starting from an outer circumferential surface of a coated electric wire for stripping the coated electric wire.

Background Art

As one of conventional processes for processing terminals of coated electric wires, a stripping process is widely used in which a coating is removed to expose an internal conductor such as a core. Furthermore, a device for forming a notch for the stripping is known which forms a notch in the coated electric wire starting from its outer circumferential surface to make a stripped region removable (see e.g. Patent Document 1). Such a type of device for forming a notch for stripping according to Patent Document 1 includes a pair of V-shaped cutter blades which is configured to clamp a coated electric wire therebetween so as to intrude into the outer circumferential surface and to be then rotated around an electric wire axis of the coated electric wire in order to form the notch for stripping.

CITATION LIST

Patent Literature

Patent Document 1: JP 2000-350324 A

SUMMARY OF THE INVENTION

Coated electric wires include a thick electric wire which includes a plurality of layers of coating materials arranged around a core and layered on each other, such as an inner coating, a braid, a metal foil, and an outer coating. In many cases, this type of device for forming a notch for stripping is configured such that the electric wire axis is used as a reference for movement of the V-shaped cutter blades to clamp the coated electric wire by the V-shaped cutter blades, wherein target positions to be reached by the V-shaped cutter blades are determined as a distance from the electric wire axis. Then, the V-shaped cutter blades are moved toward the electric wire axis to clamp the coated electric wire so that the V-shaped cutter blades intrude into it to a notch depth corresponding to the determined target positions. For example, in the case of forming a notch in a thick electric wire as mentioned above, the target positions for the V-shaped cutter blades are determined as a distance from the electric wire axis which is obtained by subtracting a thickness of a coating material to be removed from a sum of a radius of a core and individual thicknesses of the plurality of layers of coating materials. In the case of a thick electric wire, a tolerance in the target positions for the V-shaped cutter blades with the electric wire axis as the reference tend to be large because this tolerance is an accumulated tolerance obtained from a tolerance of the core radius and a tolerance of a thickness of a coating material(s) which is different from the removed coating material. This may result in a low accuracy for movement of the V-shaped cutter blades. For example, in the case of forming a notch in a thick electric wire to a desired coating material included therein, the notch may be formed to a too large depth due to a low accuracy for movement of the V-shaped cutter blades so that the notch may extend into a more inner coating material to be kept untouched. A too shallow notch may be also formed so that the notch may be insufficient for stripping.

Furthermore, many of coated electric wires are wound around bobbins for storage. During such storage, the core and/or coating may be deformed and flattened due to load by the own weight, or misalignment may occur in which the electric wire axis may be offset from a center of the coated electric wire. When notch forming is applied to a coated electric wire with such deformation and/or misalignment by the above type of device for forming a notch for stripping, rotation of the pair of V-shaped cutter blades around the electric wire axis may result in a varying notch depth obtained by the cutter blades in a direction around the electric wire axis. As a result, the obtained notch may be too deep in some region along the direction around the electric wire axis so that a more inner portion to be untouched may be cut in, wherein the notch may be too shallow in some other region along the direction around the electric wire axis so that the electric wire may be cut in only insufficiently.

Thus, the above-mentioned type of device for forming a notch for stripping, namely a device with a pair of V-shaped cutter blades which clamp a coated electric wire and are then rotated around the electric wire axis, has the problem that an accuracy for notch forming may be reduced when forming a notch in a thick electric wire and a coated electric wire wound around a bobbin for storage.

Therefore, the present invention is focused on the above problem, and an objective of the present invention is to provide a device and a method for forming a notch for stripping which enables an accuracy for notch forming to be improved in the case of forming a notch in a thick electric wire and/or a coated electric wire wound around a bobbin for storage.

In order to achieve the above-mentioned objective, a device for forming a notch for stripping includes: one or more cutting mechanisms configured to be arranged around an electric wire axis of a coated electric wire, wherein each of the one or more cutting mechanisms is configured to form one or more notches in the coated electric wire to a specified notch depth starting from an outer circumferential surface of the coated electric wire; and a rotation mechanism configured to rotate the one or more cutting mechanisms around the electric wire axis and thus extend the one or more notches in a direction around the electric wire axis in a state of the one or more cutting mechanisms which have formed the one or more notches in the coated electric wire, which makes a stripped region corresponding to the notch depth removable, wherein each of the one or more cutting mechanisms includes: a stopper which is capable of approaching and/or being separated away from the outer circumferential surface in an intersection direction intersecting the outer circumferential surface: a biasing part biasing the stopper toward the outer circumferential surface in the intersection direction; a cutter blade configured to be movable together with the stopper and movable relative to the stopper in the intersection direction: a stopper movement mechanism configured to move the stopper together with the cutter blade in the intersection direction, wherein during forming the one or more notches, the stopper movement mechanism is configured to move the stopper together with the cutter blade which has been positioned in a predetermined cutter initial position, and to thus bring the stopper into contact with the outer circumferential surface; and a cutter movement mechanism configured to move the cutter blade relative to the stopper in the intersection direction, wherein before bringing the stopper into contact with the outer circumferential surface, the cutter movement mechanism is configured to position the cutter blade in the cutter initial position, wherein after bringing the stopper into contact with the outer circumferential surface, the cutter movement mechanism is configured to forward the cutter blade to a position corresponding to the notch depth starting from the cutter initial position for forming the one or more notches in the outer circumferential surface.

In order to achieve the above-mentioned objective, the present invention also provides a method for forming a notch for stripping including: a preparation step of placing the coated electric wire in the device as described above and positioning the cutter blade and the stopper in the cutter initial position and in a stopper initial position, respectively, by means of the device, wherein the stopper initial position is spaced away from the outer circumferential surface: a stopper contact step of bringing the stopper into contact with the outer circumferential surface; after bringing the stopper into contact with the outer circumferential surface, a notch forming step of forwarding the cutter blade to a position corresponding to the notch depth for forming one or more notches therein; and a rotation step of rotating the one or more cutting mechanisms around the electric wire axis and thus extending the one or more notches in the direction around the electric wire axis in the state of the one or more cutting mechanisms which have formed the one or more notches in the coated electric wire, which makes the stripped region corresponding to the notch depth removable.

With the device and method for forming a notch for stripping, it is possible to improve the accuracy for notch forming in the case of forming a notch in a thick electric wire and/or a coated electric wire wound around a bobbin for storage.

DETAILED DESCRIPTION OF PREFERRED EMBODIMENTS

Hereinafter, embodiments of a device and a method for forming a notch for stripping will be described.

Figure 1:
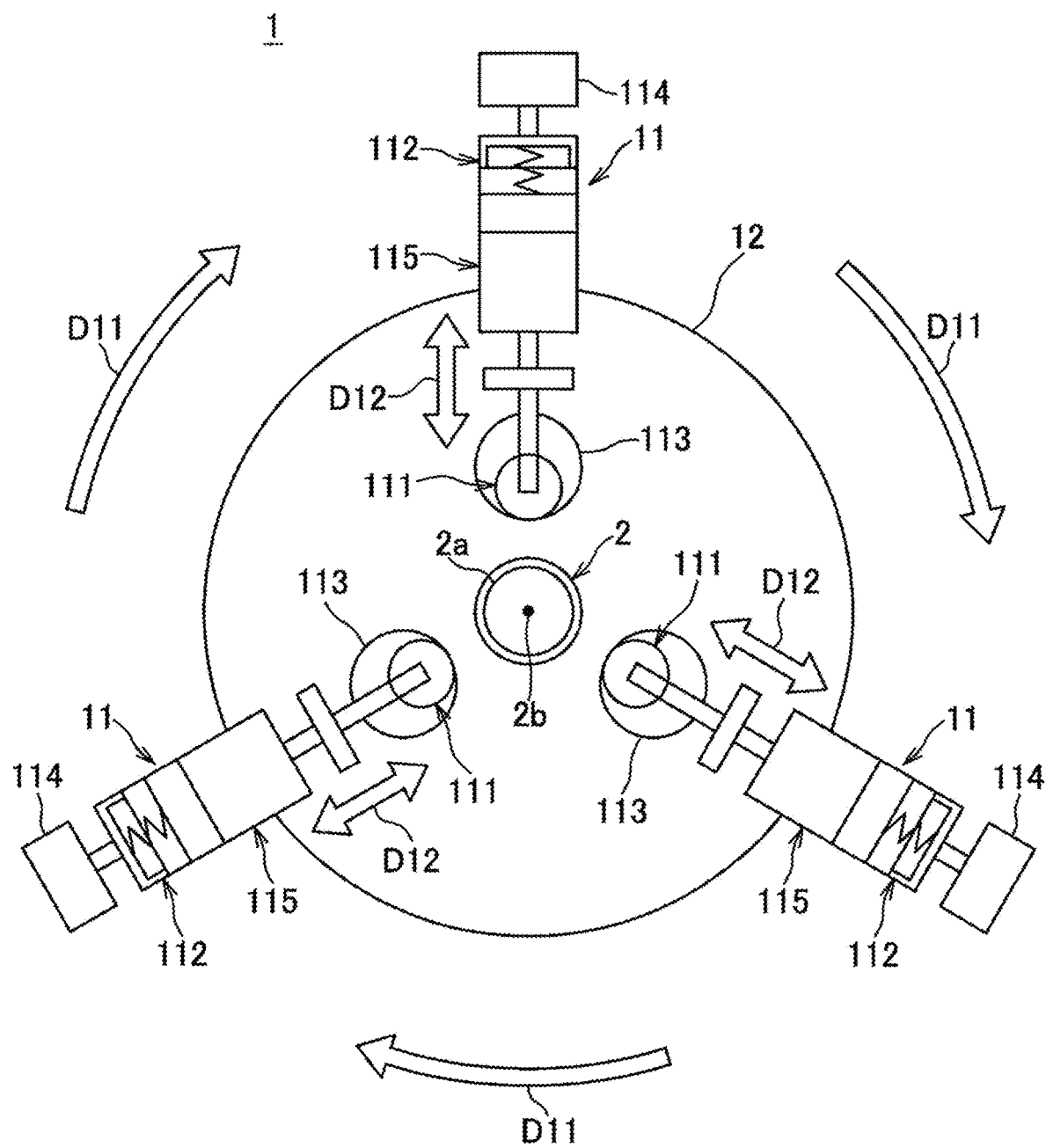
FIG. 1 shows a schematic view of a device for forming a notch for stripping according to an embodiment.
Figure 2:
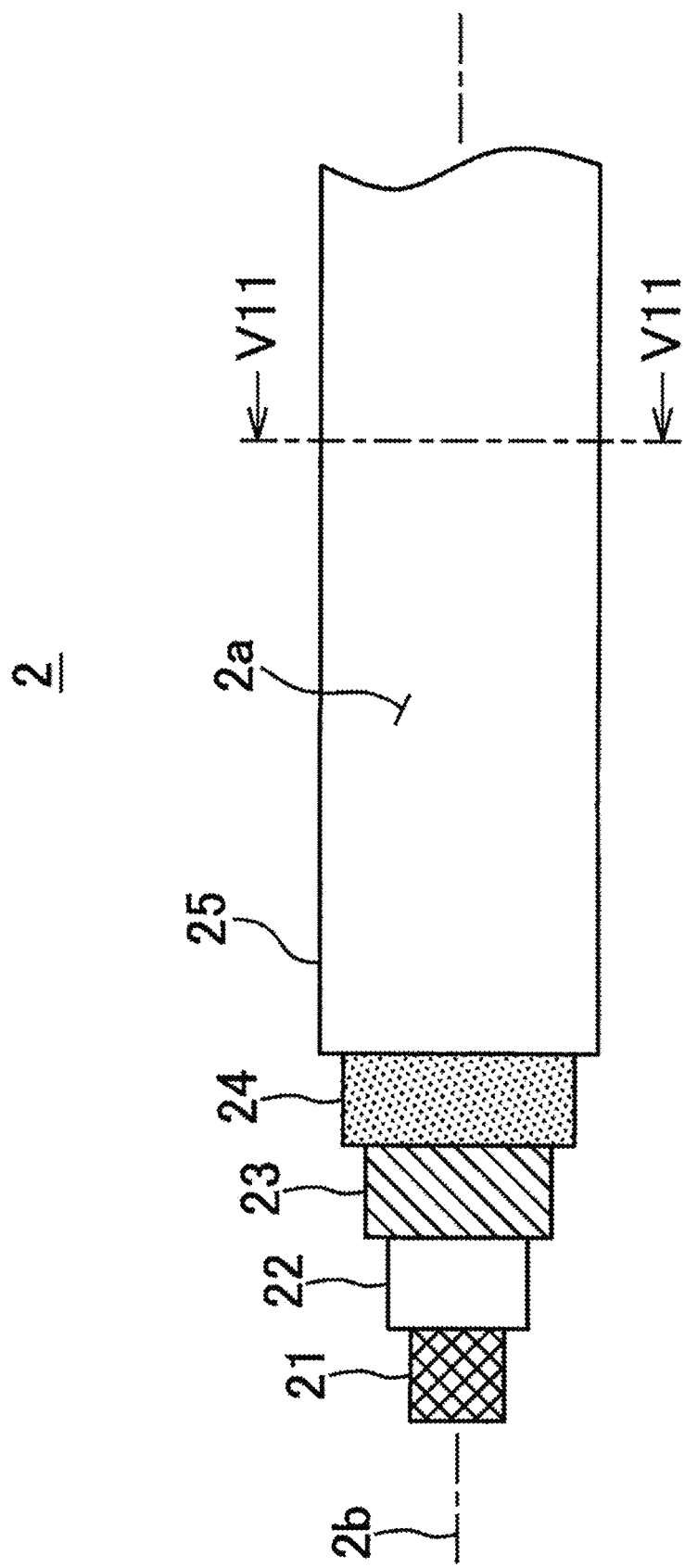
FIG. 2 shows a schematic view of a coated electric wire to which notch forming may be applied by the device for forming a notch for stripping as shown in FIG. 1.
Figure 3:
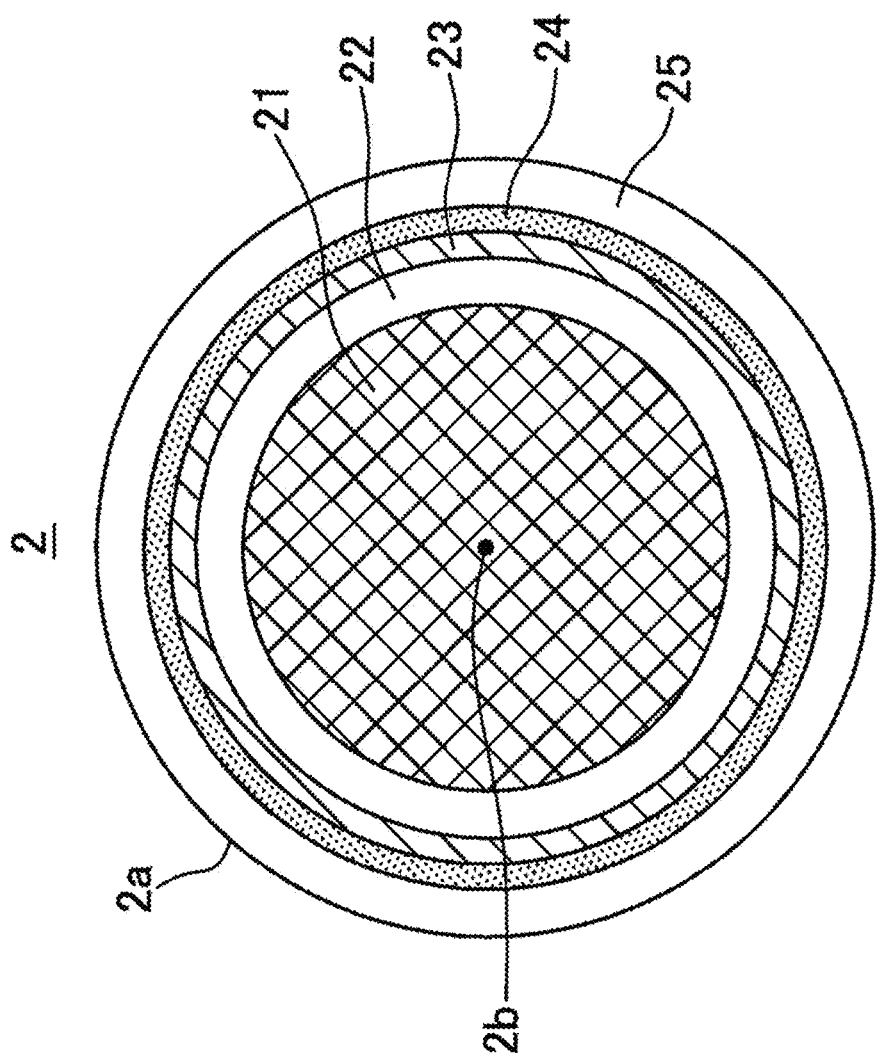
FIG. 3 shows a sectional view of the coated electric wire according to FIG. 2 along the line V11-V11 as shown in FIG. 2.

FIG. 1 shows a schematic view of a device for forming a notch for stripping according to an embodiment. FIG. 2 shows a schematic view of a coated electric wire to which notch forming may be applied by the device for forming a notch for stripping as shown in FIG. 1, and FIG. 3 shows a sectional view of the coated electric wire according to FIG. 2 along the line V11-V11 as shown in FIG. 2.

First, a coated electric wire 2 for which notch forming is applied according to the present embodiment is a thick electric wire including a plurality of layers of coating materials and a conductive core 21 covered with the plurality of layers of coating materials. This coated electric wire 2 is wound around a bobbin for storage and used e.g. for a high-voltage wire harness for an automobile. As the coating materials, the coated electric wire 2 includes an inner coating 22 made of an insulating resin, a conductive braid 23, a conductive metal foil 24, and an outermost coating 25 made of an insulating resin. For processing a terminal of the coated electric wire 2, the device 1 for forming a notch for stripping is configured to form one or more notches to a specified notch depth starting from an outer circumferential surface 2a of the coated electric wire 2, whereby a stripped region corresponding to the notch depth is removable.

For example, notch forming as described below is possible: For example, a notch forming process is possible in which a depth extending to an inner circumference of the metal foil 24 is specified as the notch depth so that the outermost coating 25 and the metal foil 24 are defined as the stripped region, wherein one or more notches extending to the inner circumference of the metal foil 24 are formed. In this example, after stripping, the braid 23 will be exposed at a terminal of the coated electric wire 2, the braid 23 accommodating the inner coating 22 and core 21 therein. Furthermore, as another example, a notch forming process is possible in which a depth extending to an inner circumference of the inner coating 22 is specified as the notch depth so that all coating materials other than the core 21 are defined as the stripped region, wherein one or more notches extending to the inner circumference of the inner coating 22 are formed. In this example, after stripping, the core 21 will be exposed at the terminal of the coated electric wire 2.

The device 1 for forming a notch for stripping is capable of forming such a notch in the coated electric wire 2, and includes three cutting mechanisms 11 and a rotation mechanism 12. Three cutting mechanisms 11 are disposed around an electric wire axis 2b of the coated electric wire 2, and configured to form one or more notches to a specified notch depth starting from the outer circumferential surface 2a of the coated electric wire 2. In the present embodiment, the three cutting mechanisms 11 are arranged and spaced from each other at an angle of 120° around the electric wire axis 2b. The rotation mechanism 12 is a mechanism configured to rotate the three cutting mechanisms 11 in a cutting rotating direction D11 around the electric wire axis 2b and thus extend the one or more notches in the cutting rotating direction D11 around the electric wire axis 2b in a state of the cutting mechanisms 11 which have formed the one or more notches in the coated electric wire 2. In the present embodiment, the rotation mechanism 12 rotates the three cutting mechanisms 11 by an angle greater than or equal to 120° in the cutting rotating direction D11 around the electric wire axis 2b. This rotation connects the notches at three locations in the direction around the electric wire axis 2b to obtain one notch extending over the entire circumference of the coated electric wire 2, whereby the stripped region corresponding to the specified notch depth is removable.

In the device 1 for forming a notch for stripping, the three cutting mechanisms 11 are configured identically. Hereinafter, configuration of the cutting mechanisms 11 will be described with respect to one of the cutting mechanisms 11.

Figure 4:
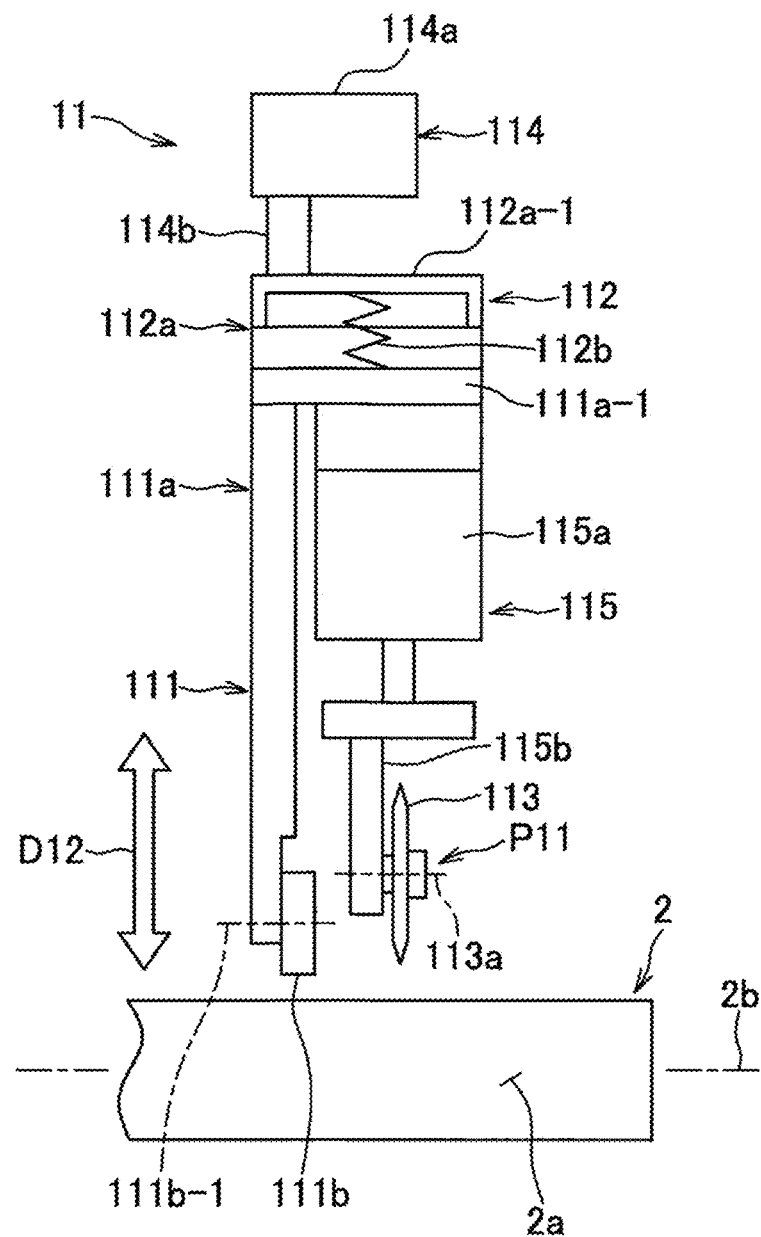
FIG. 4 shows a schematic side view of a cutting mechanism according to FIG. 1 as viewed in a cutting rotating direction.

FIG. 4 shows a schematic side view of a cutting mechanism according to FIG. 1 as viewed in a cutting rotating direction.

As shown in FIGS. 1 and 4, the cutting mechanism 11 includes a stopper 111, a biasing part 112, and a cutter blade 113, a stopper movement mechanism 114 and a cutter movement mechanism 115.

The stopper 111 is configured to be capable of approaching and/or being separated away from a outer circumferential surface 2a of the coated electric wire 2 in an intersection direction D12 intersecting the outer circumferential surface 2a. As shown in FIG. 4, the stopper 111 includes a stopper frame 111a and a stopper roller 111b, the stopper frame 111a extending in the intersection direction D12. The stopper roller 111b is a disk-shaped element which is pivotally mounted to an end of the stopper frame 111a facing the coated electric wire 2 such that the stopper roller 111b is rotatable around a roller axis 111b-1, wherein the roller axis 111b-1 extends along the electric wire axis 2b and intersects the intersection direction D12.

The biasing part 112 is an element which biases the stopper 111 toward the outer circumferential surface 2a of the coated electric wire 2 in the intersection direction D12. The biasing part 112 includes a biasing frame 112a and a compression spring 112b, the biasing frame 112a holding the stopper frame 111a of the stopper 111 so as to be movable in the intersection direction D12, wherein the compression spring 112b biases the stopper frame 111a in the intersection direction D12. The biasing frame 112a includes a spring receiving eaves section 112a-1 which is opposed to an eaves section 111a-1 of the stopper frame 111a and holds the compression spring 112b between the spring receiving eaves section 112a-1 and the eaves section 111a-1, wherein the eaves section 111a-1 overhangs on a side of the stopper frame 111a opposite to the coated electric wire 2 and holds the cutter movement mechanism 115. The compression spring 112b is configured in the form of a coil spring which is mounted in a compressed state between the eaves section 111a-1 of the stopper frame 111a and the spring receiving eaves section 112a-1 of the biasing frame 112a. The compression spring 112b biases the stopper roller 111b toward the outer circumferential surface 2a of the coated electric wire 2 via biasing the eaves section 111a-1 of the stopper frame 111a.

The cutter blade 113 is a disc-shaped cutting element which is movable together with the stopper 111 as well as movable relative to the stopper 111 in the intersection direction D12. According to the present embodiment, the cutter movement mechanism 115 includes a cutter frame 115b as described below, wherein the cutter blade 113 is mounted to the cutter frame 115b such that the cutter blade 113 is pivotable around a cutter axis 113a, wherein the cutter axis 113a extends in parallel to the roller axis 111b-1 so as to extend along the electric wire axis 2b and intersect the intersection direction D12.

The stopper movement mechanism 114 is configured to move the stopper 111 together with the cutter blade 113 in the intersection direction D12. During forming one or more notches, the stopper movement mechanism 114 moves the stopper 111 together with the cutter blade 113 which has been positioned in a predetermined cutter initial position P11, and to thus bring the stopper roller 111b of the stopper 111 into contact with the outer circumferential surface 2a of the coated electric wire 2. The stopper movement mechanism 114 includes a predetermined driving source 114a and a stopper coupling frame 114b, wherein the stopper coupling frame 114b is configured to be driven by the driving source 114a in the intersection direction D12 and is coupled to the stopper 111 via the biasing frame 112a of the biasing part 112.

The cutter movement mechanism 115 is configured to move the cutter blade 113 relative to the stopper 111 in the intersection direction D12. First, before bringing the stopper 111 into contact with the outer circumferential surface 2a of the coated electric wire 2, the cutter movement mechanism 115 positions the cutter blade 113 in the cutter initial position P11. After bringing the stopper 111 into contact with the outer circumferential surface 2a, the cutter movement mechanism 115 forwards the cutter blade 113 to a position corresponding to the specified notch depth starting from the cutter initial position P11 for forming notches. The cutter movement mechanism 115 according to the present embodiment includes a servo motor 115a as a driving source, wherein the servo motor 115a is capable of precise driving. Furthermore, the cutter movement mechanism 115 includes a cutter coupling frame 115b which is driven by the servo motor 115a in the intersection direction D12, wherein the cutter blade 113 is pivotably mounted to a tip end of the cutter coupling frame 115b facing the coated electric wire 2. The cutter movement mechanism 115 moves the cutter blade 113 precisely by means of the servo motor 115a through the cutter coupling frame 115b to move the cutter blade 113 into the outer circumferential surface 2a of the coated electric wire 2 to the specified notch depth. Here, when bringing the stopper roller 111b into contact with the outer circumferential surface 2a by the stopper movement mechanism 114, movement of the stopper 111 is buffered by absorbing excessive movement of the stopper 111 with the compression spring 112b of the biasing part 112 acting as a buffer element after bringing the stopper roller 111b into contact. For the movement of the stopper 111, precision of the stroke of the cutter blade 113 is therefore not required, and it is possible to employ, as the driving source 114a for the stopper movement mechanism 114, e.g. a general motor and/or cylinder mechanism which has a lower precision but lower costs than a servo motor 115a.

Next, a method for forming a notch for stripping will be described in which a notch for stripping is formed at a terminal of the coated electric wire 2 by using the device 1 for forming a notch for stripping as described above. Although the following description includes repetition of some of the above description, the following description will be made with reference to other figures.

Figure 5:
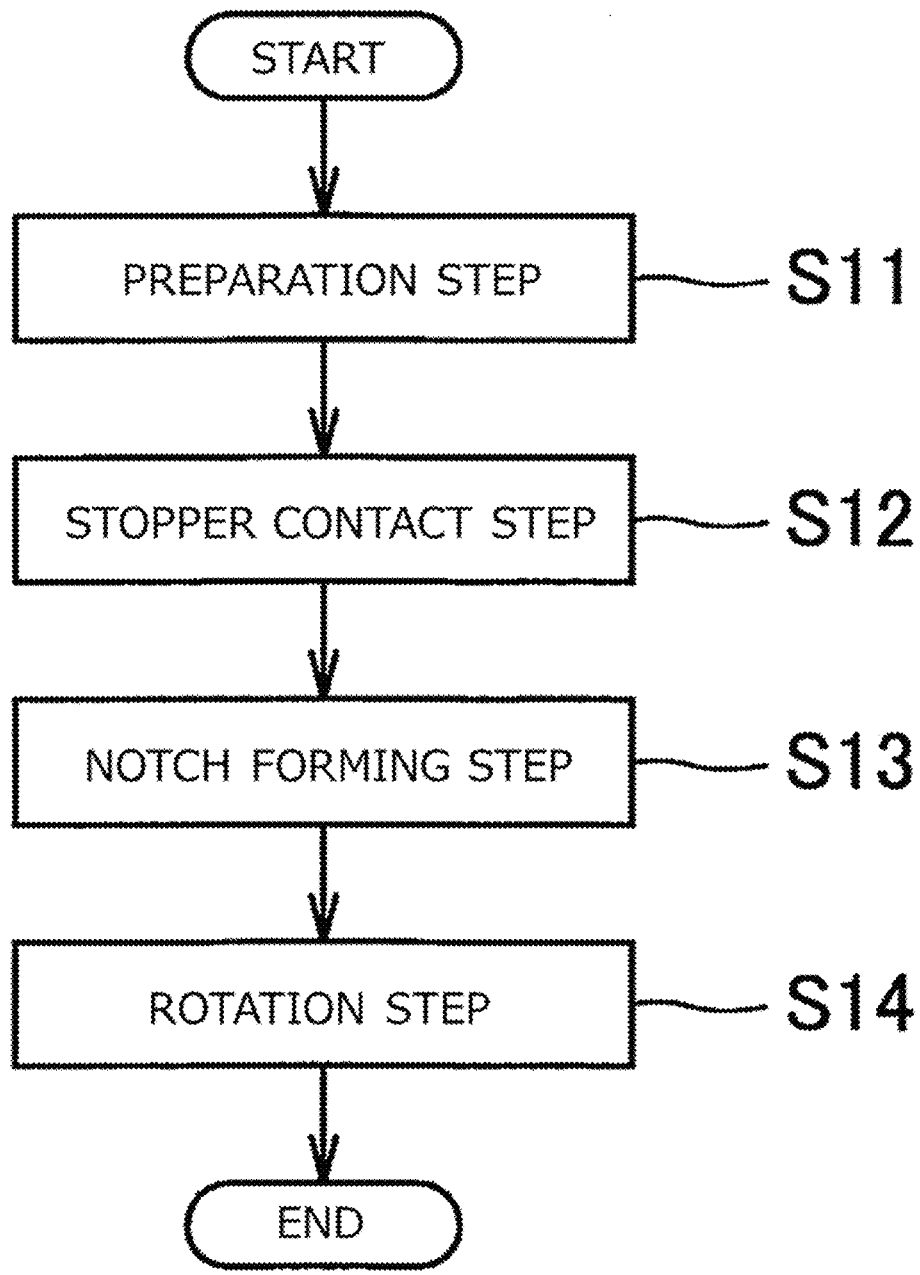
FIG. 5 shows a schematic flowchart illustrating a flow of a series of processes of a method for forming a notch for stripping at a terminal of a coated electric wire by means of the device 1 for forming a notch for stripping as shown in FIGS. 1 and 4.
Figure 6:
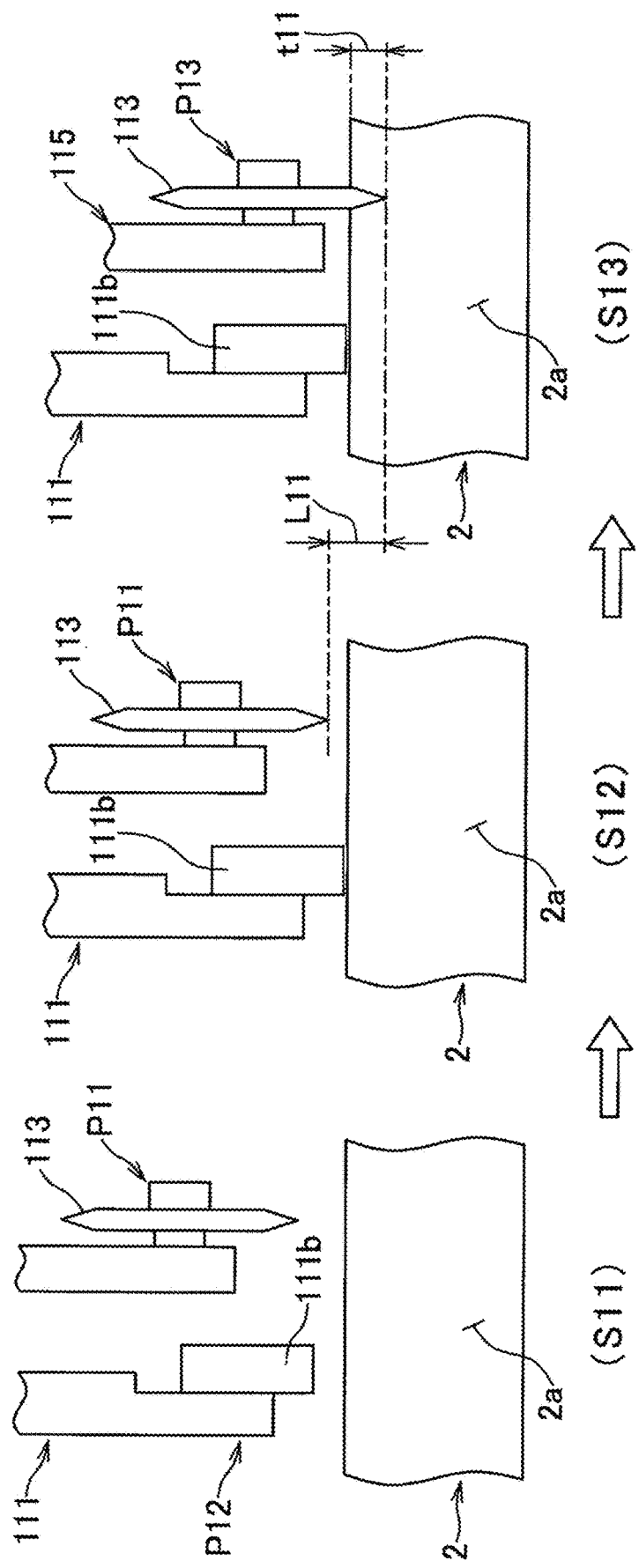
FIG. 6 shows an explanatory view for explanation of some of the processes of the method for forming a notch for stripping according to FIG. 5 by means of a peripheral structure around a stopper roller and the cutter blades as shown in the side view of FIG. 4.

FIG. 5 shows a schematic flowchart illustrating a flow of a series of processes of a method for forming a notch for stripping at a terminal of a coated electric wire by means of the device 1 for forming a notch for stripping as shown in FIGS. 1 and 4. FIG. 6 shows an explanatory view for explanation of some of the processes of the method for forming a notch for stripping according to FIG. 5 by means of a peripheral structure around a stopper roller and the cutter blades as shown in the side view of FIG. 4.

The process of the method for forming a notch for stripping according to FIG. 5 is started when the coated electric wire 2 is prepared in which a notch is formed. When the series of processes is started, a preparation step S11 is first performed. At the preparation step S11, the coated electric wire 2 is placed in the device 1, and in each of the three cutting mechanisms 11, the stopper 111 and the cutter blade 113 are positioned with respect to the coated electric wire 2. This means that the cutter blade 113 is positioned in the cutter initial position P11, and the stopper 111 is positioned in the stopper initial position P12, wherein the stopper initial position P12 is spaced away from the outer circumferential surface 2a. The cutter initial position P11 is provided such that a circumferential edge of the cutter blade 113 is located farther away from the coated electric wire 2 than a circumferential edge of the stopper roller 111b of the stopper 111.

The preparation step S11 is followed by a stopper contact step S12 of bringing the stopper roller 111b of the stopper 111 into contact with the outer circumferential surface 2a of the coated electric wire 2, wherein the stopper contact step S12 is performed by moving the stopper 111 with the stopper movement mechanism 114. At this time, the cutter blade 113 which has been positioned in the cutter initial position P11 according to the preparation step S11 is kept away from the outer circumferential surface 2a even after the stopper roller 111b is brought into contact with the outer circumferential surface 2a. At the stopper contact step S12, the stopper 111 is moved toward the outer circumferential surface 2a so that the stopper 111 is slightly pushed back against the biasing by the biasing part 112. At this time, the cutter blade 113 is moved in unison with the stopper 111.

After bringing the stopper 111 into contact with the outer circumferential surface 2a according to the stopper contact step S12, a notch forming step S13 is performed in which the cutter blade 113 is forwarded for forming a notch in the coated electric wire 2. At the notch forming step S13, the cutter blade 113 is forwarded by a forwarding amount L11 starting from the cutter initial position P11 by means of the cutter movement mechanism 115, wherein the forwarding amount L11 is provided to reach a notch forming position P13 corresponding to the specified notch depth t11. At the notch forming step S13, only the cutter blade 113 is moved without moving the stopper 111.

After the notch forming step S13 has been performed for each of the three cutting mechanisms 11, the notches are finally extended according to a rotation step S14. At the rotation step S14, the three cutting mechanisms 11 are rotated by an angle greater than or equal to 120° around the electric wire axis 2b by the rotation mechanism 12 in a state of the cutting mechanisms 11 which have formed the notches in the coated electric wire 2. With this rotation, the notches at the three locations are extended in the direction around the electric wire axis 2b to be connected to each other so that at a terminal of the coated electric wire 2, one notch is formed which extends over the entire circumference of the coated electric wire 2 in the direction around the electric wire axis 2b. Forming this notch over the entire circumference makes the stripped region corresponding to the specified notch depth t11 removable, wherein the series of processes of the method for forming a notch for stripping is ended here. After this, the removable stripped region is removed to expose an inner portion thereof. The stripped region may be removed manually by an operator, or may be removed by using a dedicated removal device.

The device 1 and method for forming a notch for stripping according to the above-described embodiment may have one or more effects as follows: According to the present embodiment, the actual outer circumferential surface 2a of the coated electric wire 2 is identified by contact of the stopper 111 with the outer circumferential surface 2a, wherein in the cutting mechanism 11, the cutter blade 113 is forwarded to the notch depth t11 starting from the identified outer circumferential surface 2a as the reference so as to intrude into the outer circumferential surface 2a. After that, the cutting mechanisms 11 are rotated around the electric wire axis 2b so that one notch extending the entire circumference of the coated electric wire 2 is formed which makes the stripped region removable. Since the actual outer circumferential surface 2a identified by contact of the stopper 111 therewith is used as the reference for forwarding the cutter blade 113, it is possible to suppress impact of accumulated thickness tolerances for individual coating materials and to thus improve the accuracy for notch forming, even for forming a notch in a thick electric wire. Furthermore, according to the present embodiment, when forming notches in a coated electric wire 2 with deformation and/or misalignment which is caused by winding and storing it around a bobbin, the stopper 111 is biased toward the outer circumferential surface 2a by the biasing part 112, and moved in the intersection direction D12 by following the outer circumferential surface 2a during rotation of the cutting mechanisms 11. Moreover, movement of the stopper 111 under biasing may enable the actual outer circumferential surface 2a to be identified without impact of the deformation and/or misalignment, wherein it is possible to use such an outer circumferential surface 2a as the reference to suppress variation of the notch depth t11 during rotation of the cutting mechanisms 11, whereby the accuracy for notch forming may be improved. In this manner, the present embodiment may enable the accuracy for notch forming to be improved in the case of forming a notch in a thick electric wire and/or a coated electric wire 2 wound around a bobbin for storage. Furthermore, for a thick electric wire, the specified notch depth t11 may be variably selected as appropriate according to the present embodiment, which allows a wide variety of notches, such as only the outermost coating 25, notches extending to the metal foil 24, braid 23 or inner coating 22, to be formed without changing a device structure.

According to the present embodiment, the stopper 111 includes the stopper roller 111b which is rotatable around the roller axis 111b-1, wherein the roller axis 111b-1 extends along the electric wire axis 2b and intersects the intersection direction D12. The stopper 111 comes into contact with the outer circumferential surface 2a at this stopper roller 111b. In this manner, the stopper 111 and the cutting mechanisms 11 may follow the outer circumferential surface 2a of the coated electric wire 2 smoothly during rotation of the cutting mechanisms 11 by the rotation mechanism 12 due to the rotatable stopper rollers 111b.

Furthermore, the biasing part 112 according to the present embodiment biases the stopper 111 by applying a bias pressure to a side of the stopper 111 opposite to the outer circumferential surface 2a in the intersection direction D12. With this configuration, vertical movement of the stopper 111 and the cutting mechanisms 11 following the outer circumferential surface 2a can be effectively absorbed in the intersection direction D12 intersecting the outer circumferential surface 2a of the coated electric wire 2.

Furthermore, according to the present embodiment, the cutter movement mechanism 115 includes the servo motor 115a. The cutter movement mechanism 115 is configured to move the cutter blade 113 by means of this servo motor 115a. This configuration may enable the accuracy for notch forming to be further improved by precisely moving the cutter blade 113 with the servo motor 115a.

It is to be noted that the embodiment as described above merely shows representative configurations for the device and method for forming a notch for stripping. The device and method for forming a notch for stripping are not limited thereto, but may be modified and implemented in various manners.

For example, the above-described embodiment shows the coated electric wire 2 to be used e.g. for a high-voltage wire harness for an automobile as an example of a coated electric wire in which a notch for stripping is formed. However, the coated electric wire to which notch forming is applied is not limited thereto, but the coated electric wire may be used in any specific manner, provided that the core is covered by one or more coating materials.

As an example of a coated electric wire in which a notch for stripping is formed, the above-described embodiment further shows the coated electric wire 2 in the form of a thick electric wire including the conductive core 21 covered with the plurality of layers of coating materials. As examples of the plurality of layers of coating materials as mentioned above, the present embodiment shows the inner coating 22 of an insulating resin, the conductive braid 23, the conductive metal foil 24, and the outermost coating 25 of an insulating resin. However, the coated electric wire for which notch forming is applied is not limited thereto, but may include a core covered with a single layer of a resin coating, and e.g. any specific layer structure may be used for the plurality of layers of coating materials, even for a thick electric wire.

Furthermore, as an example of the cutting mechanism, the above-described embodiment shows the three cutting mechanisms 11 arranged around the electric wire axis 2b of the coated electric wire 2 and spaced away from each other at an interval of an angle of 120°. However, the cutting mechanism is not limited thereto, but any specific number of cutting mechanisms and any specific arrangement thereof may be selected for the cutting mechanism, provided that one or more cutting mechanisms are arranged around the electric wire axis of the coated electric wire.

Moreover, as an example of the stopper, the above-described embodiment shows the stopper 111 which comes into contact with the outer circumferential surface 2a at the stopper roller 111b. However, the stopper is not limited thereto, but a stopper without a stopper roller is also possible which is configured in the form of a bar and/or belt and comes into contact with the outer circumferential surface of the coated electric wire at a tip end of the stopper, for example. However, the stopper 111 and the cutting mechanisms 11 may follow the outer circumferential surface 2a of the coated electric wire 2 smoothly by bringing the stopper 111 into contact with the outer circumferential surface 2a at the stopper roller 111b, as described above.

Furthermore, as an example of the biasing part, the above-described embodiment shows the biasing part 112 which biases the stopper 111 by applying the bias pressure to the side of the stopper 111 opposite to the outer circumferential surface 2a. However, the biasing part is not limited thereto, but any specific biasing implementation may be selected, provided that it biases the stopper toward the outer circumferential surface in the intersection direction. However, the biasing part 112 which biases the stopper 111 by applying the bias pressure to the side of the stopper 111 opposite to the outer circumferential surface 2a may enable the vertical movement of the stopper 111 and the cutting mechanisms 11 following the outer circumferential surface 2a to be effectively absorbed, as described above. Moreover, as an example of application of the bias pressure by the biasing part, the above-described embodiment shows that the compression spring 112b in the form of a coil spring is used which is mounted in a compressed state between the eaves section 111a-1 of the stopper frame 111a and the spring receiving eaves section 112a-1 of the biasing frame 112a. However, application of the bias pressure is not limited to methods with the compression spring, but the bias pressure may be also applied e.g. by using a damper mechanism with a hydraulic and/or pneumatic pressure. Even in the case of using a compression spring, it is not limited to coil springs, but any spring may be used such as a leaf spring, wherein any mounting structure for the spring may be also employed depending on the spring implementation.

In addition, as an example of the cutter movement mechanism, the above-described embodiment shows the cutter movement mechanism 115 which moves the cutter blade 113 by means of the servo motor 115a. Furthermore, as an example of the stopper movement mechanism, the above-described embodiment shows the stopper movement mechanism 114 which uses e.g. a general motor and/or cylinder mechanism with lower costs for the driving source 114a. However, the cutter movement mechanism and stopper movement mechanism are not limited thereto, but servo motors may be used for both mechanisms, or a motor, cylinder mechanism or the like may be used as a driving source for both mechanisms. However, the accuracy for notch forming may be further improved by using the servo motor 115a as the driving source for the cutter movement mechanism 115, as described above. In addition, the costs for the whole device may be reduced by using a general motor and/or cylinder mechanism with low costs or the like as the driving source for the stopper movement mechanism 114.

REFERENCE SIGNS LIST

1 Device for forming a notch for stripping
2 Coated electric wire
2a Outer circumferential surface
2b Electric wire axis
11 Cutting mechanisms
12 Rotation mechanism
21 Core
22 Inner coating
23 Braid
24 Metal foil
25 Outermost coating
111 Stoppers
111a Stopper frame
111a-1 Eaves section
111b Stopper roller
111b-1 Roller axis
112 Biasing part
112a Biasing frame
112a-1 Spring receiving eaves section
112b Compression spring
113 Cutter blade
113a Cutter axis
114 Stopper movement mechanism
114a Driving source
114b Stopper coupling frame
115 Cutter movement mechanism
115a Servo motor
115b Cutter coupling frame
D11 Cutting rotating direction
D12 Intersection direction
L11 Forwarding amount
P11 Cutter initial position
P12 Stopper initial position
P13 Notch forming position
S11 Preparation step
S12 Stopper contact step
S13 Notch forming step
S14 Rotation step
t11 Notch depth

What is claimed is:

1. A device for forming a notch for stripping, comprising:
one or more cutting mechanisms configured to be arranged around an electric wire axis of a coated electric wire, wherein each of the one or more cutting mechanisms is configured to form one or more notches in the coated electric wire to a specified notch depth starting from an outer circumferential surface of the coated electric wire; and
a rotation mechanism configured to rotate the one or more cutting mechanisms around the electric wire axis and thus extend the one or more notches in a direction around the electric wire axis in a state of the one or more cutting mechanisms which have formed the one or more notches in the coated electric wire, which makes a stripped region corresponding to the notch depth removable,
wherein each of the one or more cutting mechanisms includes:
a stopper which is capable of approaching and/or being separated away from the outer circumferential surface in an intersection direction intersecting the outer circumferential surface;
a biasing part biasing the stopper toward the outer circumferential surface in the intersection direction;
a cutter blade configured to be movable together with the stopper and movable relative to the stopper in the intersection direction;
a stopper movement mechanism configured to move the stopper together with the cutter blade in the intersection direction, wherein during forming the one or more notches, the stopper movement mechanism is configured to move the stopper together with the cutter blade which has been positioned in a predetermined cutter initial position, and to thus bring the stopper into contact with the outer circumferential surface; and
a cutter movement mechanism configured to move the cutter blade relative to the stopper in the intersection direction, wherein before bringing the stopper into contact with the outer circumferential surface, the cutter movement mechanism is configured to position the cutter blade in the cutter initial position, wherein after bringing the stopper into contact with the outer circumferential surface, the cutter movement mechanism is configured to forward the cutter blade to a position corresponding to the notch depth starting from the cutter initial position for forming the one or more notches in the outer circumferential surface.

2. The device according to claim 1,
wherein the stopper includes a stopper roller which is rotatable around a roller axis, the roller axis extending along the electric wire axis and intersecting the intersection direction, and
wherein the stopper is configured to come into contact with the outer circumferential surface at the stopper roller.

3. The device according to claim 1,
wherein the biasing part biases the stopper by applying a bias pressure to a side of the stopper opposite to the outer circumferential surface in the intersection direction.

4. The device according to claim 1,
wherein the cutter movement mechanism includes a servo motor, and
wherein the cutter movement mechanism is configured to move the cutter blade by means of the servo motor.

5. A method for forming a notch for stripping comprising:
a preparation step of placing the coated electric wire in the device according to claim 1 and positioning the cutter blade and the stopper in the cutter initial position and in a stopper initial position, respectively, by means of the device, wherein the stopper initial position is spaced away from the outer circumferential surface;
a stopper contact step of bringing the stopper into contact with the outer circumferential surface;
after bringing the stopper into contact with the outer circumferential surface, a notch forming step of forwarding the cutter blade to a position corresponding to the notch depth for forming one or more notches therein; and
a rotation step of rotating the one or more cutting mechanisms around the electric wire axis and thus extending the one or more notches in the direction around the electric wire axis in the state of the one or more cutting mechanisms which have formed the one or more notches in the coated electric wire, which makes the stripped region corresponding to the notch depth removable.

* * * * *